United States Patent
Hofbauer (10) Patent No.: US 8,958,971 B2
(45) Date of Patent: Feb. 17, 2015

(54) SYSTEM AND METHOD TO CONTROL AN ELECTRONICALLY-CONTROLLED TURBOCHARGER

(75) Inventor: Peter Hofbauer, West Bloomfield, MI (US)

(73) Assignee: EcoMotors, Inc., Allen Park, MI (US)

( * ) Notice: Subject to any disclaimer, the term of this patent is extended or adjusted under 35 U.S.C. 154(b) by 442 days.

(21) Appl. No.: 13/569,210

(22) Filed: Aug. 8, 2012

(65) Prior Publication Data
US 2012/0297767 A1 Nov. 29, 2012

Related U.S. Application Data

(63) Continuation-in-part of application No. 12/843,012, filed on Jul. 24, 2010, now abandoned.

(60) Provisional application No. 61/271,844, filed on Jul. 27, 2009.

(51) Int. Cl.
| | | |
|---|---|---|
| B60T 7/12 | (2006.01) | |
| F02D 41/00 | (2006.01) | |
| F02B 37/10 | (2006.01) | |
| F02B 39/10 | (2006.01) | |
| F02D 41/08 | (2006.01) | |
| F02D 41/14 | (2006.01) | |
| F02M 25/07 | (2006.01) | |
| F02D 41/18 | (2006.01) | |

(52) U.S. Cl.
CPC .......... *F02D 41/0007* (2013.01); *F02B 37/10* (2013.01); *F02B 39/10* (2013.01); *F02D 41/0052* (2013.01); *F02D 41/0072* (2013.01); *F02D 41/083* (2013.01); *F02D 41/1456* (2013.01); *F02D 41/187* (2013.01); *F02D 2250/32* (2013.01); *F02M 25/0709* (2013.01); *F02M 25/0754* (2013.01); *F02M 25/0755* (2013.01); *Y02T 10/144* (2013.01); *Y02T 10/47* (2013.01)
USPC ....... 701/103; 701/108; 123/435; 123/568.11

(58) Field of Classification Search
CPC .................... F02D 2041/0017; F02D 41/0072; F02D 41/0047
USPC .......... 701/103, 104, 108, 111; 123/434, 435, 123/672, 462, 568.11
See application file for complete search history.

(56) References Cited

U.S. PATENT DOCUMENTS

| | | |
|---|---|---|
| 1,428,924 A | 9/1922 | Thomas |
| 3,473,322 A | 10/1969 | Wolf |
| 3,895,620 A | 7/1975 | Foster |
| 4,769,993 A | 9/1988 | Kawamura |
| 4,850,193 A | 7/1989 | Kawamura |
| 4,878,347 A | 11/1989 | Kawamura |
| 4,882,905 A | 11/1989 | Kawamura |
| 4,894,991 A | 1/1990 | Kawamura |
| 4,901,530 A | 2/1990 | Kawamura |

(Continued)

*Primary Examiner* — John Kwon
(74) *Attorney, Agent, or Firm* — Diana D. Brehob (57) ABSTRACT

By providing an electrically-controlled turbocharger (ECT) on a compression-ignition (CI) engine, the engine can be provided a desired lambda and a desired EGR fraction over the range of operating conditions. When lambda in the exhaust is leaner than the desired lambda, electrical energy to the electric motor of the ECT is reduced to bring actual lambda to desired lambda. Analogously, when lambda in the exhaust is richer than the desired lambda, electrical energy to the ECT is increased.

20 Claims, 4 Drawing Sheets

(56) References Cited

U.S. PATENT DOCUMENTS

| | | |
|---|---|---|
| 4,958,497 A | 9/1990 | Kawamura |
| 4,958,708 A | 9/1990 | Kawamura |
| 5,005,539 A | 4/1991 | Kawamura |
| 5,088,286 A | 2/1992 | Muraji |
| 5,105,624 A | 4/1992 | Kawamura |
| 2,710,521 A | 6/1995 | Nettel |
| 5,605,045 A | 2/1997 | Halimi |
| 5,740,785 A | 4/1998 | Dickey |
| 5,771,695 A | 6/1998 | Halimi |
| 5,870,894 A | 2/1999 | Woollenweber |
| 5,906,098 A | 5/1999 | Woollenweber |
| RE36,690 E | 5/2000 | Halimi et al. |
| 6,062,026 A | 5/2000 | Woollenweber |
| 6,067,800 A | 5/2000 | Kolmanovsky |
| 6,604,360 B1 | 8/2003 | Vuk |
| 6,604,362 B2 | 8/2003 | Moeckel |
| 6,609,375 B2 * | 8/2003 | Allen et al. ............... 60/608 |
| 6,684,863 B2 | 2/2004 | Dixon |
| 6,705,084 B2 | 3/2004 | Allen |
| 6,739,845 B2 | 5/2004 | Woollenweber |
| 6,871,498 B1 | 3/2005 | Allen |
| 6,880,337 B2 | 4/2005 | Masuda |
| 6,925,802 B2 * | 8/2005 | Arnold ..................... 60/602 |
| 6,931,850 B2 | 8/2005 | Frank |
| 7,043,916 B2 | 5/2006 | Masuda |
| 7,076,954 B1 | 7/2006 | Sopko |
| 7,360,361 B2 | 4/2008 | Prusinski |
| 7,367,189 B2 * | 5/2008 | Ishiwatari ................ 60/608 |
| 7,503,175 B2 * | 3/2009 | Isogai ....................... 60/607 |
| 7,779,634 B2 * | 8/2010 | Barthelet et al. ......... 60/607 |
| 2011/0107739 A1 * | 5/2011 | Shimizu et al. ........... 60/273 |

* cited by examiner

SYSTEM AND METHOD TO CONTROL AN ELECTRONICALLY-CONTROLLED TURBOCHARGER

CROSS REFERENCE TO RELATED APPLICATIONS

The present application is a continuation in part of US 2011/0022289 A1 filed 24 Jul. 2010 which claims the benefit of provisional application U.S. 61/271,844, filed 27 Jul. 2009.

FIELD

The present disclosure relates to controlling stoichiometry and EGR to desired levels in an internal-combustion engine that has an electronically-controlled turbocharger (ECT).

BACKGROUND

Control over air-fuel ratio (i.e., stoichiometry) and EGR fraction while maintaining low fuel consumption is not possible with a conventional turbocharger. Such control is desired as lower emission levels can be achieved as well as low fuel consumption.

SUMMARY

Disclose herein a method to control an internal-combustion engine system that has an electronically-controlled turbocharger (ECT). The ECT has: a turbine disposed in an exhaust of the engine, a compressor disposed in an intake of the engine, a common shaft onto which the turbine, the compressor, and electric machine are fixedly coupled. The engine has an exhaust gas recirculation (EGR) duct fluidly coupling the engine intake and the engine exhaust and an EGR valve disposed in the EGR duct. The method includes: determining a desired lambda and a desired EGR fraction based on a demanded torque; determining an EGR valve position and an electrical energy input/output to the electric motor of the ECT to obtain the desired lambda and the desired EGR fraction; commanding the EGR valve to the determined EGR valve position; and commanding the determined energy input/output to the electric machine associated with the ECT. Additionally, a throttle valve position based on a desired EGR fraction is determined and then commanded to the throttle valve. The demanded torque is determined based on a signal from an accelerator pedal position sensor. A fuel pulse width is commanded to the injectors based on the demanded torque.

The actual lambda is determined based on a signal from a wide-range exhaust oxygen sensor disposed in an exhaust of the engine. The energy input/output to the electrical machine is adjusted based on a difference between the actual lambda and the desired lambda and such adjusted energy input/output is commanded to the electrical machine. An actual EGR fraction is determined based on a signal from a differential pressure flow meter measuring pressure differential across the EGR valve. The desired EGR fraction fuel pulse width commanded to fuel injectors disposed in the engine. The determined EGR valve position is adjusted based on a difference between the actual EGR and the desired EGR. The adjusted EGR valve position is commanded to the EGR valve.

At some operating conditions in which the pressure difference between the intake and the exhaust is insufficient to obtain the desired EGR flow even when the EGR valve is fully open, a throttle valve position is determined based on a desired EGR fraction. The determined throttle valve position is determined based on the difference between the actual EGR and the desired EGR. The adjusted throttle valve position is commanded to the throttle valve.

In some situations, it is determined that energy should be input to the electrical machine, which means that the electric machine is operated as a motor. In other situations, it is determined that energy be extracted from the electric machine meaning that the electric machine operates as a generator.

The desired lambda and the desired EGR are further based on engine speed in some embodiments.

An engine system is disclosed that includes an internal combustion engine; an electrically-controlled turbocharger (ECT) having a turbine disposed in an exhaust of the engine, a compressor disposed in an intake of the engine, a common shaft coupling the turbine and the compressor, and an electric machine coupled to the shaft; an exhaust gas recirculation (EGR) duct fluidly coupling the engine intake and the engine exhaust and an EGR valve disposed in the EGR duct; and an electronic control unit (ECU) electronically coupled to the engine and the electric machine. The ECU: determines a demanded torque from the engine, determines a desired lambda and a desired EGR fraction based on the demanded torque, and determines an EGR valve position and an electrical energy input/output to the electric machine of the ECT to obtain the desired lambda and the desired EGR fraction. The ECU commands the EGR valve to the determined position and commands the desired electrical energy input/output to the electric machine.

The system also includes an exhaust gas oxygen sensor disposed in the engine exhaust and electronically coupled to the ECU. The ECU determines an actual lambda based on a signal from the exhaust gas oxygen sensor and adjusts the electrical energy input/out to the electric machine based on a difference between the actual lambda and the desired lambda.

Alternatively, the system includes a mass air flow sensor disposed in the engine intake and electronically coupled to the ECU and a fuel injector disposed in an engine cylinder and electronically coupled to the ECU. The ECU determines an actual lambda based on a signal from the exhaust gas oxygen sensor and a pulse width commanded to the fuel injector. The ECU adjusts the electrical energy input/output to the electric machine based on a difference between the actual lambda and the desired lambda.

The system may further include an accelerator pedal position sensor electronically coupled to the ECU; and the ECU determines the demanded torque based on a signal from the accelerator pedal position sensor.

The ECU determines an actual lambda; the ECU commands an increase in the amount of electrical energy commanded to the electric motor when the actual lambda is less than the desired lambda; and the ECU commands a decrease in the amount of electrical energy commanded to the electric motor when the actual lambda is greater than the desired lambda.

The engine system also includes a differential pressure sensor associated with the EGR valve to provide a signal related to flow through the EGR valve. The differential pressure sensor is electronically coupled to the ECU to provide a signal from which actual EGR fraction can be computed. The ECU commands an adjustment to the EGR valve position based on a difference between the actual EGR fraction and the desired EGR fraction.

The engine system further includes a throttle valve disposed in the engine intake upstream of a location at which the EGR duct couples to the engine intake. The throttle valve is electronically coupled to the throttle valve. The ECU determines a throttle valve position to obtain the desired EGR fraction. The ECU commands the throttle valve to the determined position.

The determined EGR position and the determined energy input/output to the electric machine of the ECT are found by accessing lookup tables based at least on the demanded torque and the engine speed. Alternatively, the determined EGR position and the determined energy input/output are found as functions of engine torque, engine speed, and other engine parameters.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Before discussing embodiments of the disclosure, a short background on stoichiometry is provided. Stoichiometry refers to the relative quantities of the substances taking part in the chemical reaction. In internal-combustion engines, this refers to the relationship between the fuel and air provided to the engine cylinder to participate in combustion. Commonly, air-fuel ratio (AFR), i.e., the mass of air divided by the mass of fuel is used as a measure of stoichiometry. Or, a normalized measure of stoichiometry, lambda, is defined as the AFR_actual divided by AFR_stoich, where the AFR_actual is the AFR determined to be provided to the cylinder and AFR_stoich is the stoichiometric AFR in which if the reaction proceeds to completion, neither fuel or air remain. Lambda=1 indicates stoichiometric operation; lambda<1 is fuel rich; and lambda>1 is fuel lean. The normalized air-fuel ratio, lambda, is used herein.

Figure 1:
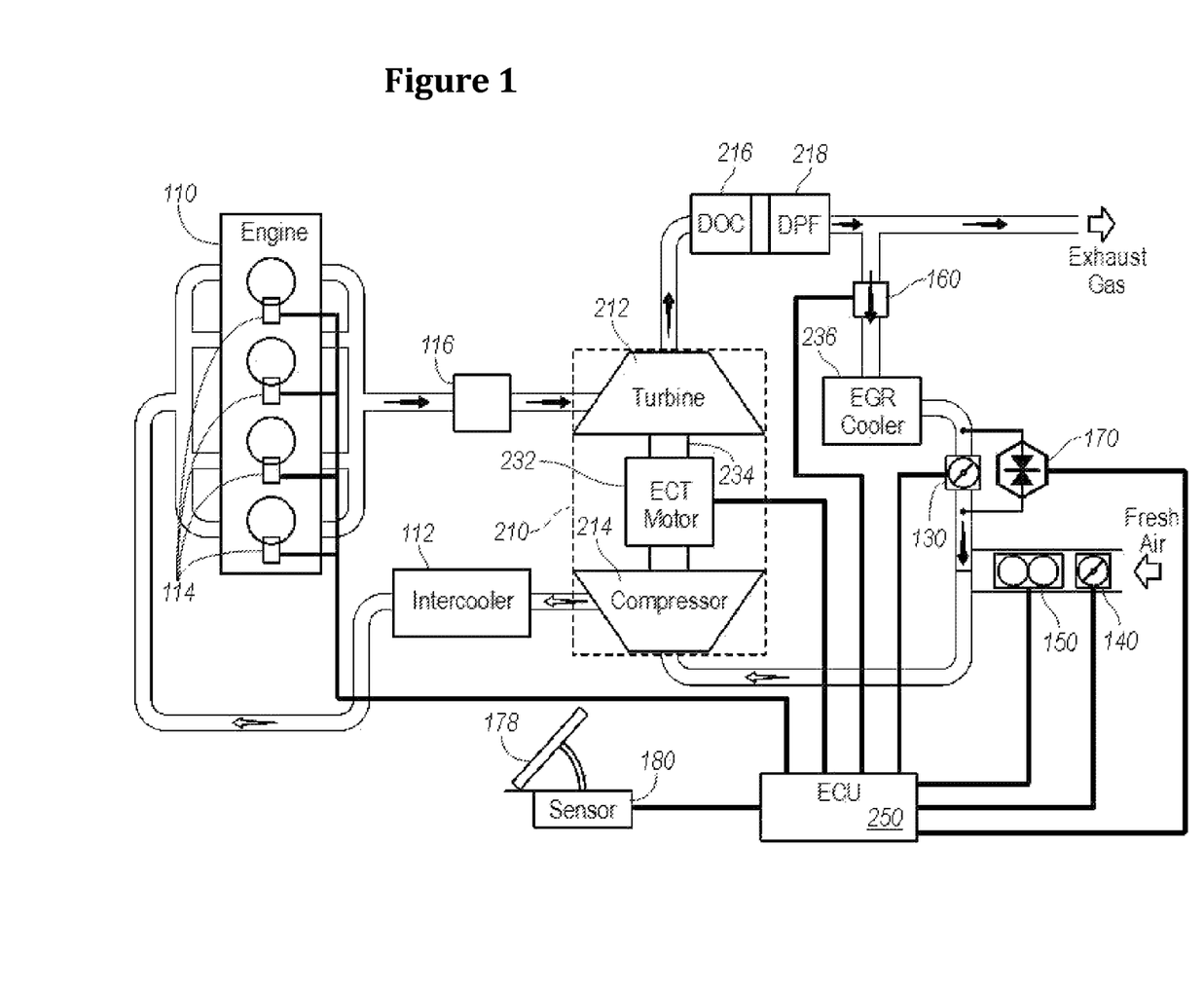
FIG. 1 is a schematic drawing of a compression-ignition engine system.

In FIG. 1, a turbocharged, CI engine system 100 is shown schematically. System 100 includes an engine 110 that has an ECT 210. ECT 210 includes a turbine 212 disposed in an exhaust 122 of engine 110 that is coupled via a shaft 234 to a compressor 214 disposed in an intake 120 of engine 110. An electric motor 232 is provided on shaft 234 of ECT 210. Electric motor 232 is controlled via an electronic control unit (ECU) 250.

Engine system 100 is provided with a low-pressure EGR system in which a portion of the exhaust gas stream is diverted into the engine intake stream. The EGR system includes an exhaust gas oxygen sensor 160, a differential pressure sensor 170, an EGR cooler 236, and an EGR valve 130. ECU 250 is coupled to exhaust gas oxygen sensor 160 to determine exhaust gas stoichiometry, i.e., lambda. Exhaust gas oxygen sensor 160 can alternatively be placed in a portion of exhaust 122. Differential pressure sensor 170, from which EGR flow can be determined, is also coupled to ECU 250. EGR valve 130 is controlled by ECU 250 to provide a desired EGR fraction. The EGR system in FIG. 1 is a low-pressure system. Alternatively, the EGR system may be a high-pressure system in which the exhaust gas is diverted upstream of turbine 212 and introduced into the intake downstream of compressor 214.

Intake 120 of engine system 100 further includes an electronic throttle 140 and a mass air flowmeter 150. In some embodiments, an intercooler 112 is provided downstream of compressor 214. Fuel is directly injected into engine 110 cylinders by injectors 114.

Exhaust 122 has a close-coupled, diesel, oxidation catalyst 116 upstream of turbine 212. Further aftertreatment devices may be placed downstream of turbine 212. A diesel oxidation catalyst 216 and a diesel particulate filter 218 are shown in FIG. 1. Although not shown, other alternatives include a selective catalyst reduction (SCR) and/or a lean NOx trap (LNT) to control NOx emissions.

By depressing an accelerator pedal 178 in the vehicle, a vehicle operator provides a signal indicating demanded torque. An accelerator pedal sensor 180 is electronically coupled to ECU 250. The signal from pedal sensor 180 is used, in conjunction with other inputs, to determine how ECU 250 commands fuel injection pulses, throttle 140, EGR valve 130, and ECT motor 232. In FIG. 1, a single ECU 250 controls fuel injection quantity, motor 232, EGR valve 130, and throttle 140. Alternatively, the functions in ECU 250 can be handled via multiple controllers.

Figure 2:
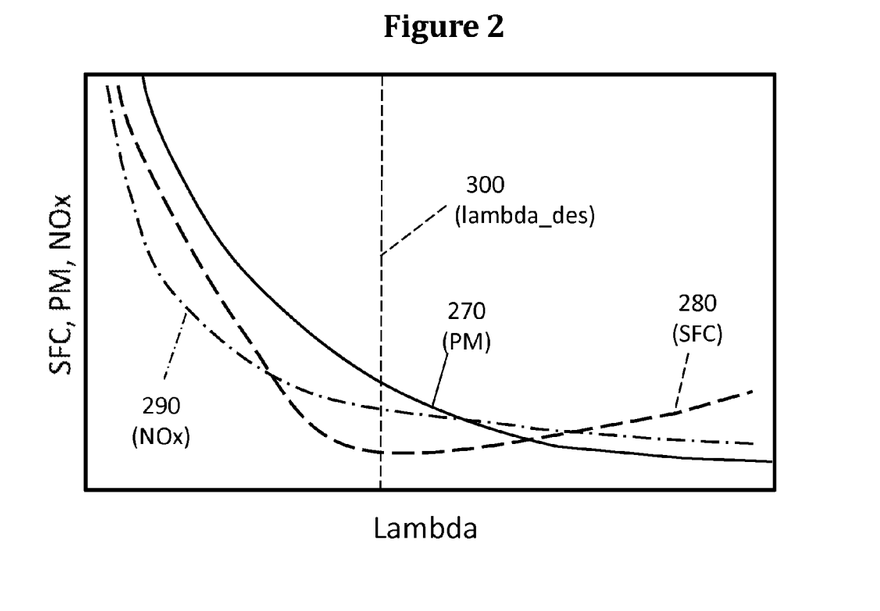
FIG. 2 is a plot of specific fuel consumption, NOx concentration, and PM mass as a function of lambda in a CI engine with a conventional turbocharger.

In FIG. 2, the specific fuel consumption (SFC) 290, NOx concentration 280, and particulate matter (PM) mass 270 are plotted as a function of lambda (i.e., engine stoichiometry) at a particular operating condition. PM mass 270 reduces monotonically with increasing lambda, i.e., as the mixture becomes leaner. NOx concentration 280 and SFC 290 reduce as lambda increases. Also shown in FIG. 2 is a vertical dotted line 300 at lambda_des (desired lambda). Lambda_des is a condition at which the SFC is at or near its minimum, NOx is at or near its minimum, and PM is at a moderate level. The NOx, PM, and SFC curves of FIG. 2 are for a particular operating condition. Although the curves vary in magnitude as operating condition changes and lambda_des varies depending on operating condition, the relative shape of the curves is substantially correct. Furthermore, lambda_des may be selected to further the goals of a particular emission strategy. If a NOx reducing aftertreatment strategy is employed, operating at the lambda which provides the lowest SFC is preferred. If the goal were to avoid a NOx reducing aftertreatment device, the lambda that provides the lowest NOx is preferred. Nevertheless, a lambda_des can be defined as a function of engine operating condition in light of an overall engine emission strategy map.

Figure 3:
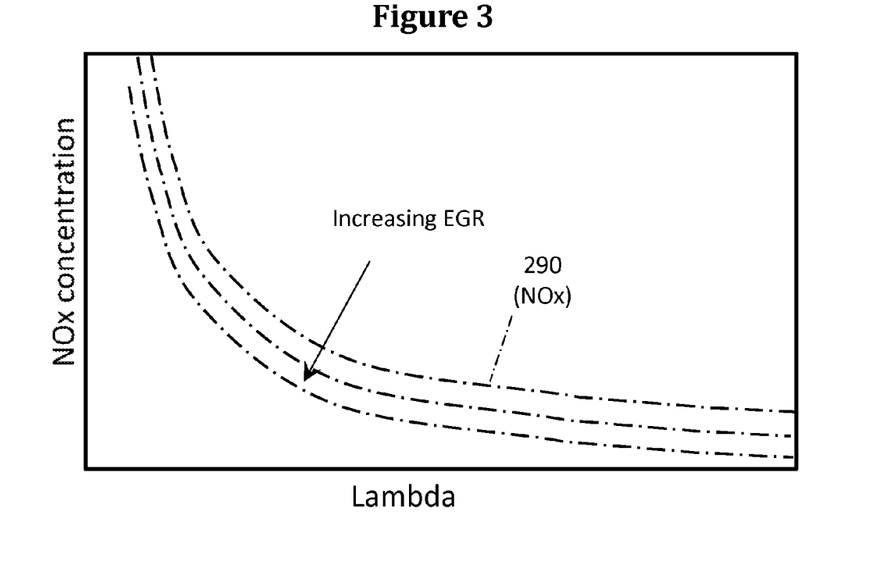
FIG. 3 is a plot of NOx concentration as a function of lambda for a range of EGR fractions.

The NOx concentration shown in FIG. 2 is for a particular EGR fraction. NOx, in particular, is very sensitive to EGR fraction, as shown in FIG. 3. SFC is less affected as long the EGR does not reduce lambda significantly because PM and CO (carbon monoxide) becomes very high at high EGR when lambda is reduced. It is desirable to keep EGR below such level that affects PM and CO. However, it is possible to also define an EGR_des based on other goals.

Figure 4:
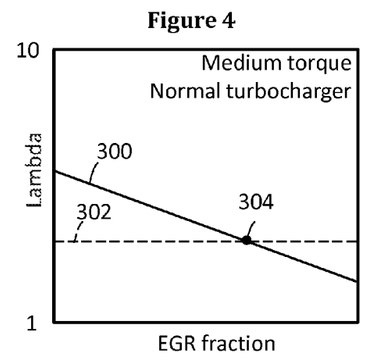
FIGS. 4, 6, and 8 are graphs of lambda as a function of EGR fraction for three engine operating conditions for a CI engine with a conventional turbocharger.

In FIG. 4, lambda as a function of % EGR is plotted as a solid line 300 at a medium torque operating condition for a normal turbocharger. Line 300 intersects lambda_des 302 at point 304. That is, at such an operating condition illustrated in FIG. 4, it is possible to access lambda_des simply by adjusting the EGR valve to provide the EGR fraction which results in lambda_des.

Figure 5:
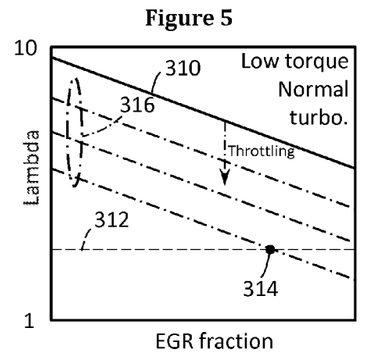
FIGS. 5, 7, and 9 are graphs of ECT power as a function of EGR fraction for the three engine operating conditions of FIGS. 4, 6, and 8, respectively, for a CI engine with an ECT.

In FIG. 5, lambda as a function of EGR fraction is plotted as a solid line 310 at a low torque operating condition, again with a normal turbocharger. In such a condition, the reduction in lambda as EGR fraction is increased is insufficient to access lambda_des, dashed line 312. By throttling, lambda can be reduced such as shown by the family of dash-dot curves 316 (such as at point 314). However, throttling increases SFC. Thus, such a strategy is used only when the desire for very low emissions is more important than low fuel consumption.

Figure 6:
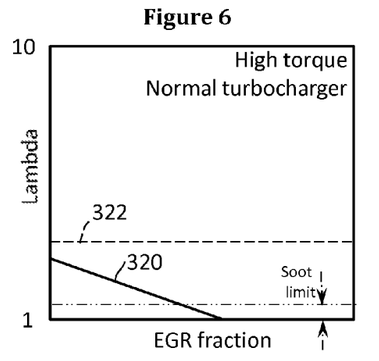

In FIG. 6, lambda 320 as a function of EGR fraction at a high torque operating condition shows that lambda_des 322 cannot be accessed regardless of EGR fraction. At high EGR fractions, lambda is so low that it accesses the smoke limited range. With a conventional turbocharger, no measures exist to attain lambda_des 322. Instead, SFC, NOx, and PM and CO are compromised due to the inability to attain lambda_des 322.

Lambda as a function of EGR fraction is illustrated as a straight line in FIGS. 5-9. The actual relationship may be slightly curved. Nevertheless, is it known that lambda reduces monotonically as a function of EGR fraction.

Figure 7:
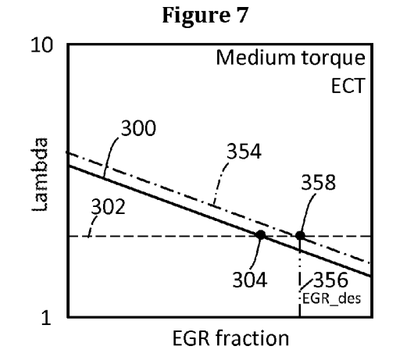

FIG. 7 is at the same operating condition as shown in FIG. 4, but with an ECT. With no power added to or extracted from the electric motor, the curve 300 and lambda_des 302 are the same. As discussed above, in addition to their being a lambda_des, there is also an EGR_des (desired EGR fraction) dash-dot-dot line 356. By providing a small amount of electrical energy to the ECT, the dash-dot line 354 results. Both lambda_des and EGR_des are accessed at point 358.

Figure 8:
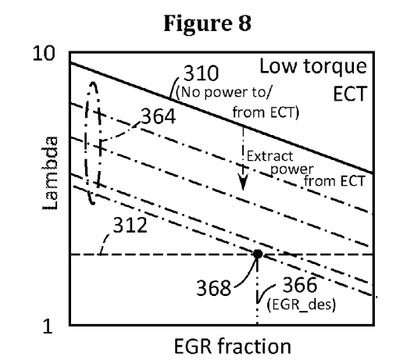

FIG. 8 is at the same operating condition as FIG. 5, but with an ECT. Curve 310 is obtained by not providing power to or extracting power from the ECT, i.e., the same as a conventional turbocharger. By operating the ECT as a generator, curves 364 can be accessed (at a range of loads placed on the ECT). By selecting the load to place on the motor and selecting the position of the EGR valve, EGR_des (dash-dot-dot line 366) and lambda_des (dashed line 312) are accessed at point 368.

Figure 9:
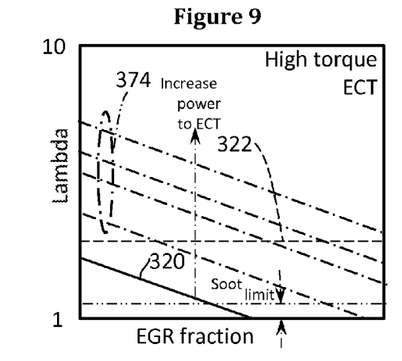

FIG. 9 illustrates the same operating condition as FIG. 6, but using an ECT in place of a conventional turbocharger. Curve 320 is the same in FIGS. 6 and 9, i.e., with no electrical energy to or from the ECT. Lambda_des, dashed line 322, can be accessed only by delivering power to the ECT. The relationship between lambda and EGR fraction is illustrated by a family of curves 374 depending on the amount of electrical energy provided to the ECT. By commanding both the energy provided to the ECT and the position of the EGR valve, EGR_des (dash-dot-dot line 376) and lambda_des (dashed line 322) can be simultaneously accessed at point 378.

In the above discussion, it has been described that a range in EGR fraction can be accessed by adjusting the EGR valve position alone. However, one of the great advantages of a compression ignition engine over a spark ignition engine (operated at lambda of 1 throughout most of the operating range) is due to lower pumping losses from throttling. However, without throttling, there is very little pressure difference between the intake and the exhaust to drive the EGR. Thus, at anything beyond low EGR fractions, the EGR valve and the intake throttle (130 and 140, respectively, in FIG. 1) are both adjusted to obtain EGR_des. It is to be understood that at some operating conditions, both the throttle valve and the EGR valve are adjusted to obtain EGR_des and the ECT compensates for the small throttle losses.

Lambda_des and EGR_des are not constant over the operating range, but can be determined via engine mapping.

Because the ECT provides the ability to access lambda and EGR conditions that would be inaccessible with a conventional turbocharger, the overall operating envelope is expanded. Such an engine system with an ECT relies less on the aftertreatment system to obtain the desired emission levels.

Figure 10:
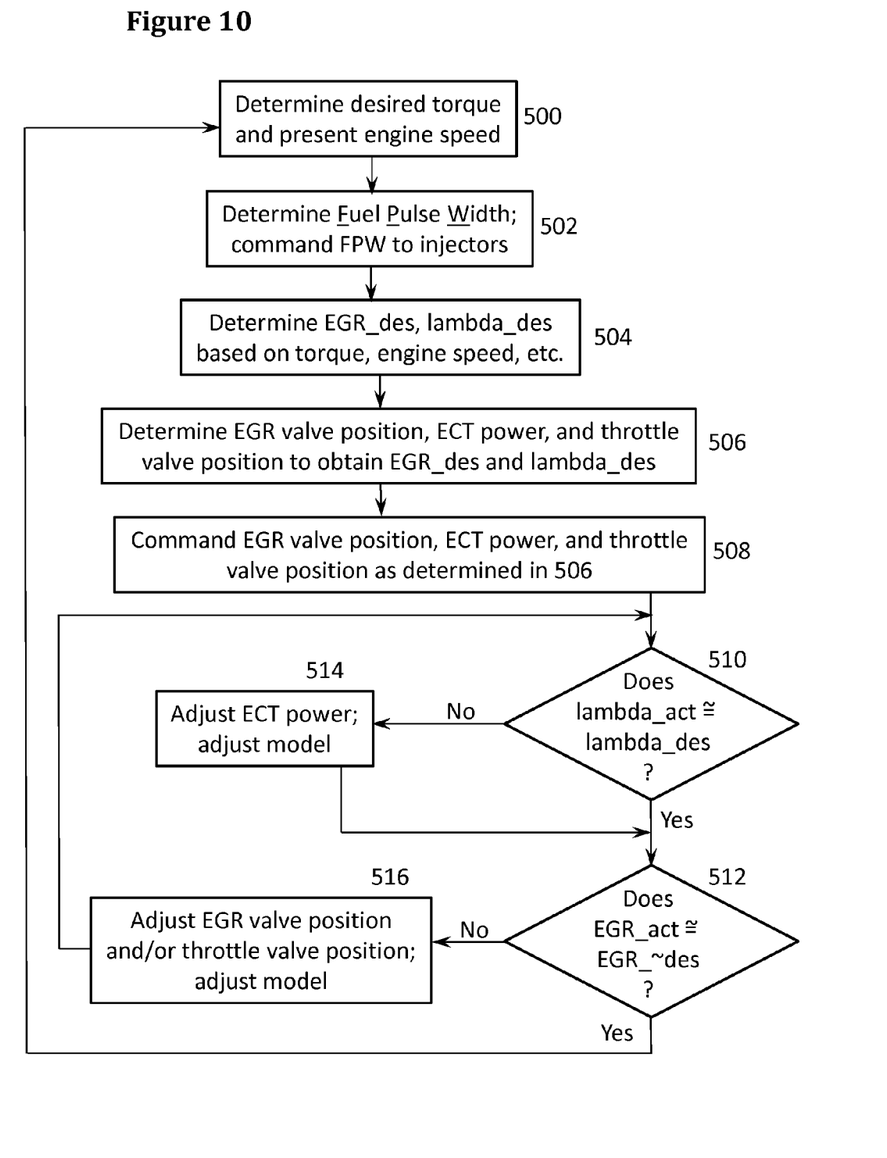
FIG. 10 is a flowchart indicating how to set the actuators to obtain lambda_des and EGR_des.

A flowchart illustrating one way to control the engine system is shown in FIG. 10. A desired torque is determined based on a signal from an accelerator pedal position sensor or any other suitable sensor or command such as a command from an autonomous controller in block 500. The present engine speed is also known, as well as other parameters such as temperatures and pressures in the engine and can also be found in block 500. In block 502, a fuel pulse width is determined. Fuel pulse width substantially depends on torque with a lesser dependence on engine speed (N) and other engine parameters. The fuel pulse width is commanded to the injectors in block 502. In block 504, EGR_des and lambda_des are determined based on torque and engine speed. EGR_des and lambda_des may be further based on additional parameters such as humidity, temperatures, and pressures. EGR_des and lambda_des can be found in a multi-dimensional lookup table or from a fitted equation such as a polynomial or any suitable relationship to describe the relationship. In block 506, a desired EGR valve position, a desired EGR power (input of electrical energy, no power, or output of electrical energy), and a throttle valve position are determined and commanded to provide EGR_des and lambda_des. In block 508, the desired valve positions and EGR power are commanded to the EGR valve, the ECT, and the throttle valve. Blocks 500, 502, 504, 506, and 508 illustrate open loop control with regard to EGR_des and lambda_des.

In blocks 510, 512, 514, and 516, closed-loop adjustment is shown. In block 510, lambda_act and lambda_des are compared. Lambda_act can be found by a wide-range, exhaust-gas oxygen sensor; an air meter and fuel pulse width; or any suitable technique. If lambda_act and lambda_des are substantially equal, control passes to 512. If the difference between them is greater than a threshold, control passes to block 514 in which ECT power is adjusted to bring lambda_act closer to lambda_des. If a consistent difference is found between the two multiple times through block 510, a correction factor can be applied to the lookup tables or the equation (also performed in block 514). If a positive result in block 510, control passes to block 512 in which EGR_act is compared to EGR_des. If the difference is greater than a threshold in EGR, control passes to block 516 in which the EGR valve position and the throttle valve position (if within an operating condition in which the throttle valve plays a role in determining EGR fraction) are adjusted. If a consistent offset is found to occur in multiple passes in block 516, an offset can be applied to the lookup tables or a correction to the equation from which the control parameters to the ECT, the throttle valve, and the EGR valve are computed. From block 516, control returns to block 510 to recheck lambda as a result of the changes in block 516. If a positive result from block 512, control returns to 500 to react to changes in the demanded torque.

The order of the operations shown in FIG. 10 is not intended to be limiting, but merely illustrative of one embodiment. As just one example, blocks 510 and 512 could be in reverse order with the corresponding blocks 514 and 516, respectively, also changed around.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

I claim:

1. A method of controlling the operation of an internal-combustion engine system having an electronically-controlled turbocharger (ECT), the ECT having: a turbine disposed in an exhaust of the engine, a compressor disposed in an intake of the engine, a common shaft onto which the turbine, the compressor, and an electric machine are fixedly coupled; and the engine also comprising an exhaust gas recirculation (EGR) duct fluidly coupling the engine intake and the engine exhaust and an EGR valve disposed in the EGR duct, the method comprising:
   determining a desired lambda and a desired EGR fraction based on a demanded torque;
   determining an electrical energy input/output to the electric motor of the ECT and an EGR valve position to obtain the desired lambda and the desired EGR fraction;
   commanding the determined energy input/output to the electric machine associated with the ECT; and
   commanding the EGR valve to the determined EGR valve position.

2. The method of claim 1, further comprising:
   determining a throttle valve position based on the desired EGR fraction; and
   commanding the throttle valve to the desired throttle valve position.

3. The method of claim 1, further comprising: determining the demanded torque based on a signal from an accelerator pedal position sensor.

4. The method of claim 1, further comprising:
   determining an actual lambda based on a signal from a wide-range exhaust oxygen sensor disposed in the engine exhaust;
   adjusting the determined energy input/output to the electrical machine based on a difference between the actual lambda and the desired lambda; and
   commanding the adjusted energy input/output to the electrical machine.

5. The method of claim 1, further comprising:
   determining an actual EGR fraction based on a signal from a differential pressure flow meter measuring pressure differential across the EGR valve;
   adjusting the determined EGR valve position based on a difference between the actual EGR and the desired EGR; and
   commanding the adjusted EGR valve position to the EGR valve.

6. The method of claim 5, further comprising:
   determining a throttle valve position based on a desired EGR fraction;
   adjusting the determined throttle valve position based on the difference between the actual EGR and the desired EGR; and
   commanding the adjusted throttle valve position to the throttle valve.

7. The method of claim 1 wherein when energy is input to the electrical machine, the electrical machine operates as a motor and when energy is output from the electrical machine, the electrical machine operates as a generator.

8. The method of claim 1 wherein the desired lambda and the desired EGR fraction are further based on engine speed.

9. The method of claim 3, further comprising: commanding a fuel pulse width to the injectors based on the desired torque.

10. An engine system, comprising:
    an internal combustion engine;
    an electrically-controlled turbocharger (ECT) having a turbine disposed in an exhaust of the engine, a compressor disposed in an intake of the engine, a common shaft coupling the turbine and the compressor, and an electric machine coupled to the shaft;
    an exhaust gas recirculation (EGR) duct fluidly coupling the engine intake and the engine exhaust and an EGR valve disposed in the EGR duct; and
    an electronic control unit (ECU) electronically coupled to the engine and the electric machine wherein the ECU determines a demanded torque from the engine; the ECU determines a desired lambda and a desired EGR fraction based on the demanded torque; the ECU determines an EGR valve position and an electrical energy input/output to the electric machine of the ECT to obtain the desired lambda and the desired EGR fraction; the ECU commands the EGR valve to the determined position; and the ECU commands the desired electrical energy input/output to the electric machine.

11. The engine system of claim 10, further comprising:
    an exhaust gas oxygen sensor disposed in the engine exhaust and electronically coupled to the ECU wherein the ECU determines an actual lambda based on a signal from the exhaust gas oxygen sensor and the ECU adjusts the electrical energy input/out to the electric machine based on a difference between the actual lambda and the desired lambda.

12. The engine system of claim 10, further comprising:
    a mass air flow sensor disposed in the engine intake and electronically coupled to the ECU; and
    a fuel injector disposed in an engine cylinder and electronically coupled to the ECU wherein the ECU determines an actual lambda based on a signal from the exhaust gas oxygen sensor and a pulse width commanded to the fuel injector; and the ECU adjusts the electrical energy input/output to the electric machine based on a difference between the actual lambda and the desired lambda.

13. The engine system of claim 10, further comprising:
    an accelerator pedal position sensor electronically coupled to the ECU wherein the ECU determines the demanded torque based on a signal from the accelerator pedal position sensor.

14. The engine system of claim 10 wherein the ECU determines an actual lambda; the ECU commands an increase in the amount of electrical energy commanded to the electric motor when the actual lambda is less than the desired lambda; and the ECU commands a decrease in the amount of electrical energy commanded to the electric motor when the actual lambda is greater than the desired lambda.

15. The engine system of claim 11, further comprising:
a differential pressure sensor associated with the EGR valve to provide a signal related to flow through the EGR valve wherein the differential pressure sensor electronically coupled to the ECU providing a signal from which actual EGR fraction can be computed and the ECU commands an adjustment to the EGR valve position based on a difference between the actual EGR fraction and the desired EGR fraction.

16. The engine system of claim 10, further comprising:
a throttle valve disposed in the engine intake upstream of a location at which the EGR duct couples to the engine intake wherein the throttle valve is electronically coupled to the throttle valve; the ECU determines a throttle valve position to obtain the desired EGR fraction; and the ECU commands the throttle valve to the determined position.

17. The engine system of claim 10 wherein the determined EGR position and the determined energy input/output to the electric machine of the ECT are found by accessing lookup tables based at least on the demanded torque and the engine speed.

18. A method of controlling the operation of an internal-combustion engine system having an electronically-controlled turbocharger (ECT), the ECT having: a turbine disposed in an exhaust of the engine, a compressor disposed in an intake of the engine, a common shaft onto which the compressor, the turbine, and an electric machine are fixedly mounted; the engine also having a throttle valve disposed in the engine intake and an exhaust gas recirculation (EGR) duct fluidly coupling the engine intake and the engine exhaust and an EGR valve disposed in the EGR duct, the method comprising:
determining a desired lambda and a desired EGR fraction based on a demanded torque;
determining an EGR valve position, a throttle valve position, and an electrical energy input to the electric motor of the ECT to obtain the desired lambda and the desired EGR fraction;
commanding the EGR valve to the determined EGR valve position;
commanding the throttle valve to determined throttle valve position; and
commanding the determined energy input to the electric machine associated with the ECT.

19. The method of claim 18 wherein the throttle valve is located upstream of the EGR duct which is located upstream of the compressor.

20. The method of claim 18 wherein the determined EGR valve position, the determined throttle valve position, and the determined energy input to the electric machine are computed as functions of demanded torque, engine speed, and at least one engine parameter.

\* \* \* \* \*